United States Patent
Czerner

(10) Patent No.: US 9,056,371 B2
(45) Date of Patent: Jun. 16, 2015

(54) METHOD FOR RECONTOURING A COMPRESSOR BLADE OR A TURBINE BLADE FOR A GAS TURBINE

(75) Inventor: Stefan Czerner, Hamburg (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 856 days.

(21) Appl. No.: 13/221,927

(22) Filed: Aug. 31, 2011

(65) Prior Publication Data

US 2012/0047735 A1 Mar. 1, 2012

(30) Foreign Application Priority Data

Aug. 31, 2010 (DE) .................. 10 2010 036 042

(51) Int. Cl.
*B23P 6/00* (2006.01)
*B23K 26/00* (2014.01)
*F01D 5/00* (2006.01)

(52) U.S. Cl.
CPC ............ *B23P 6/002* (2013.01); *Y10T 29/49318* (2015.01); *Y10T 29/49748* (2015.01); *B23K 26/0075* (2013.01); *B23K 26/0081* (2013.01); *B23K 2201/001* (2013.01); *F01D 5/005* (2013.01); *Y02T 50/671* (2013.01); *Y02T 50/673* (2013.01); *F05D 2230/80* (2013.01); *B23K 26/0009* (2013.01); *B23K 26/0015* (2013.01); *B23K 26/0051* (2013.01)

(58) Field of Classification Search
CPC ............ B23P 6/00; B23P 6/007; B23P 6/002; B23K 26/067; B23K 26/0656; B23K 26/06; B23K 26/0643; B23K 26/0639; B29C 59/16; B29C 2035/0827; B29C 71/02; F01D 5/005; Y10T 29/49748; Y10T 29/49318
USPC ........ 29/889.1, 889.2, 889.23, 889.7, 889.71, 29/889.72, 402.01, 402.05, 402.06, 29/402.09, 402.19, 557; 219/121.6, 219/121.65, 121.66, 121.73; 264/446, 447, 264/479, 480, 482
See application file for complete search history.

(56) References Cited

U.S. PATENT DOCUMENTS

| 5,038,014 A | 8/1991 | Pratt et al. |
|---|---|---|
| 5,189,278 A | 2/1993 | Frietsch |
| 6,302,625 B1 | 10/2001 | Carey et al. |
| 6,490,791 B1 | 12/2002 | Surace et al. |
| 7,722,793 B2 * | 5/2010 | Gueguen et al. ............ 264/447 |
| 2006/0042083 A1 * | 3/2006 | Baker et al. ................ 29/889.1 |
| 2006/0049236 A1 | 3/2006 | Minor |
| 2009/0208342 A1 | 8/2009 | Mons |
| 2009/0297356 A1 | 12/2009 | Moroso |
| 2010/0176097 A1 | 7/2010 | Zhu |
| 2012/0180278 A1 | 7/2012 | Bertoli |

FOREIGN PATENT DOCUMENTS

| DE | 3942051 B4 | 8/1990 |
|---|---|---|
| DE | 4020700 A1 | 1/1992 |
| DE | 4110941 C2 | 10/1992 |
| DE | 102007056112 A1 | 5/2009 |

(Continued)

*Primary Examiner* — Ryan J Walters
(74) *Attorney, Agent, or Firm* — Leydig, Voit & Mayer, Ltd.

(57) ABSTRACT

A method for recontouring a blade of a gas turbine includes systematically melting a portion of a leading edge of the blade using an energy beam so as to form a new contour of hardened material substantially without incorporating additional material.

16 Claims, 3 Drawing Sheets

(56) References Cited

FOREIGN PATENT DOCUMENTS

| | | | |
|---|---|---|---|
| DE | 102009004661 A1 | 7/2010 |
| EP | 0514604 A2 | 11/1992 |
| EP | 2130638 A1 | 12/2009 |
| GB | 2109726 A | 6/1983 |
| JP | 2004169585 A | 6/2004 |
| JP | 2006062080 A | 3/2006 |
| JP | 2009191847 A | 8/2009 |
| JP | 2009287561 A | 12/2009 |
| JP | 2013506089 A | 2/2013 |

\* cited by examiner

METHOD FOR RECONTOURING A COMPRESSOR BLADE OR A TURBINE BLADE FOR A GAS TURBINE

CROSS REFERENCE TO RELATED APPLICATIONS

This application claims priority to German Patent Application No. DE 10 2010 036 042.2 filed Aug. 31, 2010, which is hereby incorporated by reference herein in its entirety.

FIELD

The present invention relates to a method for recontouring a compressor blade or a turbine blade for a gas turbine.

BACKGROUND

Components in gas turbines, especially in aircraft engines, are subject to wear and tear during operation due to erosive substances, for example, sand or dust or ice. In the front part of the gas turbine, the area of the compressor, erosion generally causes a flattening of the flow leading edges of the compressor blades. When the compressor blades are not yet worn down, they have an aerodynamically optimized profile that is detrimentally affected by the wear. As a consequence of such the deterioration of the aerodynamic profile, the gas turbine loses efficiency, which means that the gas turbine needs more fuel to generate the same power. Therefore, from a financial point of view, it is desirable to counteract the wear of compressor blades, especially a deterioration of the aerodynamically optimized blade geometries. For this purpose, repair methods have become common practice that are aimed at once again providing damaged compressor blades with the most aerodynamically optimized geometries possible. A common repair method for compressor blades is, for example, grinding the leading edge of compressor blades. This grinding procedure rounds and smoothes the flattened profile areas and the roughened surfaces of these areas. A device for such a repair method for turbine blades that is based on the grinding of the flow leading edges is described, for example, in U.S. Pat. No. 6,302,625 B1. Generally speaking, turbine blades can refer to any blades that are used in a gas turbine. For the person skilled in the art, however, turbine blades are generally only those that are used in the area of the turbine of the engine, whereas compressor blades are only used in the area of the compressor. However, the term gas turbine blades will be used below to refer to compressor blades (including fan blades) as well as to turbine blades.

One problem encountered with such repair methods lies in the nature of the grinding process. Grinding is a metal-cutting process, that is to say, material is ground off until an aerodynamically advantageous leading edge is obtained. The loss of the basic material of the gas turbine blade during the grinding procedure, however, can be about equal to the loss of basic material due to the erosion itself. Consequently, erosive wear during operation removes basic material from the gas turbine blade, and then subsequently, a comparable quantity of basic material is once again removed during the standard repair procedure. Thus, this two-fold reduction of material has the direct effect of shortening the chord length of the gas turbine blade, in other words, as seen in the flow direction, the gas turbine blade becomes shorter or the effective surface of the gas turbine blade is diminished, which, in turn, as a rule, causes a further reduction in the efficiency and/or aerodynamic stability (regarding the stall margin, i.e. the safety margin to the turbine blade stall) of the gas turbine blades. This effect occurs every time a repair is carried out until the chord length is so short that, for example, a compressor blade can no longer be used. In this context, nicks or dents caused, for example, when rocks and birds are sucked into the gas turbine blades, result in an especially pronounced shortening of the chord length. Since such nicks generally have a very negative impact on the mechanical and aerodynamic properties of the gas turbine blades, a great deal of material has to be removed from the gas turbine blades until the nick is completely ground away or rounded off over a large surface area. Moreover, the pure loss of mass, that is to say, the reduction in weight of the gas turbine blade is problematic, irrespective of the above-mentioned change in the component geometry. If, for example, compressor blades are ground down on an assembled engine, that is to say, on an aircraft engine that is still attached to the wing of the aircraft ('on wing'), then unbalances can arise since different amounts of material are removed from the individual compressor blades. In repair methods in which the gas turbine blades are dismantled from the gas turbine, unbalances can be reduced by a process of weighing and subsequent weight-specific distribution. However, such repair methods that involve dismantling the gas turbine are also many times more laborious and can only be carried out on site with great difficulty or not at all.

SUMMARY

In an embodiment, the present invention provides a method for recontouring a compressor blade or a turbine blade for a gas turbine that entails removing the smallest possible amount of material.

In an embodiment, the present invention provides a method for recontouring a blade of a gas turbine including systematically melting a portion of a leading edge of the blade using an energy beam so as to form a new contour of hardened material substantially without incorporating additional material.

BRIEF DESCRIPTION OF THE DRAWINGS

Embodiments of the invention will be explained in greater depth below with reference to the drawings, in which.

DETAILED DESCRIPTION

Figure 1:
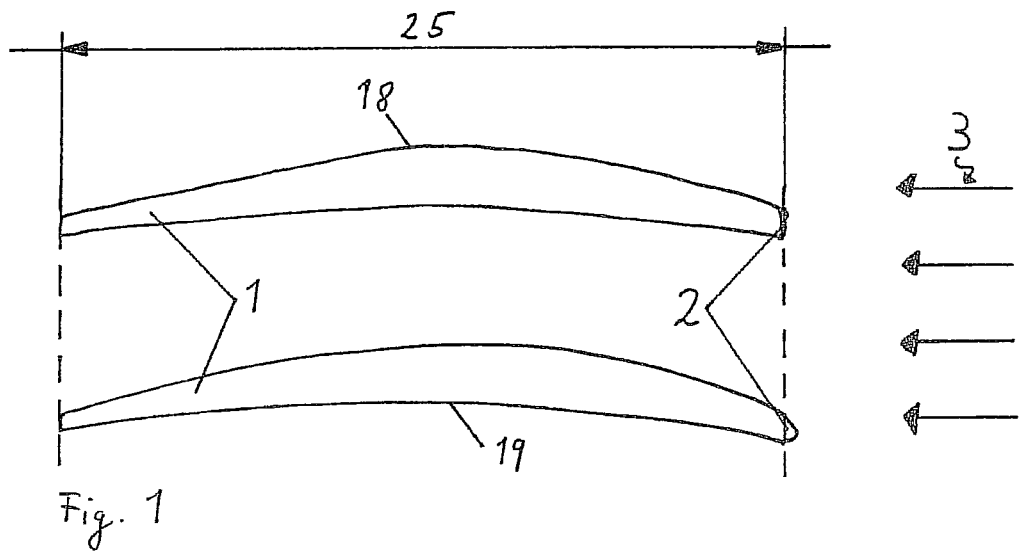
FIG. 1 shows a schematic depiction of two compressor blades in the compressor of a gas turbine.

In an embodiment, the present invention provides a method for recontouring a compressor blade or a turbine blade for a gas turbine in which at least a portion of the leading edge of the compressor blade or the turbine blade is systematically melted by a beam of energy in such a way that the material hardens to form a specified new contour, essentially without the incorporation of additional material. In this context, the term a new contour means an aerodynamically advantageous contour that has been changed with respect to the unprocessed leading edge. In particular, a new contour refers to the shaping of the rounding of the flow leading edge that is flattened in the eroded state, that is to say, sometimes angular. The new contour refers here to a profile that is largely aimed a replicating the delivery state of the new component. It designates a contour that is similar to that of the delivery state and that results from the recontouring procedure according to the invention. Due to the melting process, for example, nicks and dents can be eliminated since the melt flows into such indentations in the gas turbine blade and fills them up. As a result, the leading edge does not have to be ground down to a level deeper than the nick, but rather, in an ideal manner, no appreciable amount of material is removed, and the material of the gas turbine blade is merely redistributed. This redistribution of the material distinguishes the method according to the invention from methods according to the state of the art in which portions of the leading edge are indeed melted (for example, during deposit-welding), but this is done with the incorporation of a substantial amount of additional material. For example, during deposit-welding, additional material is typically applied in an amount that is several times the melted volume of the original material. Due to this additional material, for example, during deposit-welding, an eroded leading edge is built up again, and the volume as well as the mass of the leading edge and thus of the compressor blade or the turbine blade are increased. The method according to the invention is carried out essentially without the incorporation of additional material and thus differs from the known methods according to the state of the art. A special advantage of the method according to the invention is that no material is lost due to metal-cutting processes (for example, grinding processes) during the recontouring. Consequently, the recontouring does not result in any (or an extremely minimal) change in the moment weight and consequently, does not cause any measurable (or an extremely small) change in the roundness due to the mass inertia of the gas turbine blades when they are in the installed state. As a result, rebalancing is not necessary. Furthermore, an advantage of the method according to the invention is that the chord length of the gas turbine blades is not further shortened by the repair work, but rather, as described below, it can even be partially built up again. This means that the gas turbine blade can be used for a much longer time, significantly reducing the maintenance costs of the engine.

Preferably, the material hardens to form a specified new contour essentially without the incorporation of additional material. In this context, specified means that the melting of the material and the subsequent change in geometry do not take place randomly, but rather that at least an attempt is made to create a certain shape or geometry for the new contour that is improved, for instance, in terms of its aerodynamic properties. A "specification" in the sense of a "specified new contour" is, for example, also the endeavor to create a new contour that lengthens or restores the chord length of the gas turbine blade.

Preferably, the chord length of the compressor blade or turbine blade is lengthened by means of the method by 0.1 mm to 5 mm, more preferably by 0.1 mm to 2 mm, for example, 1.5 mm. Preferably, the restoration is carried out by fewer than 7, more preferably by fewer than 4, recontouring procedures or melt-welding procedures. In contrast to known deposit-welding, very little or no additional material is incorporated.

Another advantage of the invention can be seen in the fact that, in contrast to known deposit-welding procedures, little or no preparation of the welding substrate or of the leading edge is needed. Normally, in preparation for the deposit-welding, several millimeters of the basic material are ground off the gas turbine blade, whereas a recontouring procedure as set forth by the invention does not require such complicated preparation.

Preferably, the leading edge is rounded off by the melting procedure. The rounding improves the aerodynamic properties of the gas turbine blade, since a rounded leading edge has much better aerodynamic properties than a planar leading edge. In order to create the rounding, the normally high surface tension of the materials that are commonly used on the front edges of gas turbine blades, for instance, Ti6A14V or Inconel 718, is used in order to round off the leading edge of these gas turbine blades. The result of the high surface tension of the material melt is that the melt has a tendency to acquire a spherical shape that is energetically optimal for it. Thanks to the advantageous utilization of the surface tension of the melt, the recontoured leading edge thus has the aerodynamically advantageous rounding.

Preferably, the energy from the energy beam that is introduced into the portion is regulated in such a way that different rounding radii are created. For example, a temperature regulation of the surface of the material melt can be achieved by regulating the power of the energy introduced by the energy beam. Since the temperature of the surface of the melt has a direct influence on the surface tension of the melt, the temperature control can also be systematically used to select the surface tension of the melt. As the temperature rises, the surface tension changes by a tension gradient multiplied by the temperature differential. In the case of pure metals, this tension gradient is negative, which means that these metal melts undergo a reduction in the surface tension as the temperature rises. This effect is utilized to achieve the desired rounding radius by regulating the surface temperature. Not only the temperature, but also the melted volume and the size of the surface area of the melted area are selected and varied. In order to assist in the energy and temperature regulation, for example, camera systems can also be used to observe the surface, and the data is then used as needed in order to control the recontouring. The energy introduced into the portion can be regulated, for example, in that the energy density of the energy beam is changed, or in that the energy beam is moved in a controlled manner.

Preferably, the leading edge is recontoured by melting it multiple times to form the new contour. Preferably, the leading edge is recontoured by melting it six times at the maximum. Due to the erosive effects on the leading edge of the gas turbine blade, it loses its aerodynamically optimized contour over the course of time. Erosive wear, nicks and dents lead to a non-homogeneous erosion contour. As a rule, prior to the repair, this erosion contour of the leading edge is shaped so as to be virtually planar or perpendicular to the flow direction with great roughness. This erosion contour can be changed into a homogeneous new contour that is aerodynamically greatly improved and that has a high quality if the erosion contour is melted locally multiple times and rounded off through the utilization of the surface tension of the material melt. Due to the multiple melting procedures, it is also easier to achieve different rounding radii that are conducive for an flow-optimized contour of the gas turbine blade or of the fan blade, at the leading edge.

Preferably, the energy beam employed in this process is aimed into the leading edge in a direction that is perpendicular to the face of the erosion contour. The direct aiming of the energy beam onto the face causes the energy beam to precisely strike the portion of the leading edge of the gas turbine blade that has been damaged by erosion. Here, it can be advantageous to provide means to absorb the beams so that the energy beam is not coupled into other components or component areas in an undefined manner due to reflecting or grazing radiation. The energy beam preferably recontours the width of the leading edge in two or more rounding steps. In several systematic rounding steps, the leading edge is recontoured so as to come closer to the desired new contour with each step. This approach yields the best results since only a limited amount of material is melted at any one time, and this can be controlled more easily during the melting as well as during the hardening. The advantage of this recontouring is that it is possible to systematically build up some of the chord length that has been lost due to erosion. Consequently, the method according to the invention can not only avoid a shortening of the chord length that would result from grinding procedures, but, thanks to the redistribution of the material of the leading edge, it can also once again build up some of the eroded chord length. Owing to the greater chord length, the gas turbine blade that has been repaired in this manner is aerodynamically better than a gas turbine blade that has been repaired by means of known methods, and besides, the service life is extended, since the critical chord length at which repairs are no longer possible is only reached after a much larger number of recontouring procedures.

Preferably, the rounding radii generated are 0.1 mm to 10 mm since these rounding radii lead to good aerodynamic properties of the repaired gas turbine blades.

Preferably, very small amounts of additional substances can be introduced into the area melted by the energy beam. Although the method according to the invention is characterized in that the incorporation of additional material can be dispensed with, it is nevertheless possible to add very small amounts of additional substances (less than 50%, preferably less than 25%, especially preferably less than 10% of the melted volume) to the melt zone, for instance, in order to achieve a leading edge that is especially hard and erosion-resistant or that has other advantages. The difference from prior-art methods is that these additives do not serve so much to restore eroded volume of the leading edge (as is the case, for example, with deposit-welding), but rather to advantageously modify the material properties of the leading edge.

Preferably, the compressor blades or the turbine blades are repaired on wing, that is to say, while the blades of the gas turbine are installed on the aircraft, so that gas turbine blades do not have to be dismantled. The on-wing repair according to the invention is far superior to an on-wing repair according to the state of the art, which essentially consists in that a worker manually grinds the compressor blades of the first compressor stage (fan blades) with abrasive paper or with a grinding machine. The already described advantage of the minimization of material loss has the desirable side effect that, in contrast to grinding procedures, no chips or dust can fall into the engine. These chips can cause damage in the engine since, for example, they can clog cooling openings or can cause material fires or metal diffusions in HPT blades (turbine blades that are used in the area downstream from the combustion chamber, the high-pressure turbine). In addition to these problems, which are caused by chips and dust, it is also possible to avoid problems due to so-called 'windmilling' (blade rim rotation) during the processing.

The term windmilling refers to an unwanted rotation of the first compressor stage, the fan, that can result, for example, from a light breeze. In the case of repair methods according to the state of the art, windmilling is due to the fact that the gas turbine blade is being repaired by means of a scraper, a grinding machine or a milling cutter via which a contact pressure is exerted on the gas turbine blade during the repair work, thus causing the gas turbine blade to rotate. For this reason, the blade rim of the engine, e.g. the fan, has to be immobilized during the repair. However, immobilizing the fan entails the risk that a torque induced by the processing can damage the dovetail guide of the fan blade or of the disk. Although the fan could be immobilized by blocking the LPT (low pressure turbine), such an approach involves complex documentation since there is a need to ensure that the blocking cannot cause any damage to the disk or to the pressure faces of the blade root. Moreover, immobilizing the fan increases the requisite work since, once the shaft has been immobilized, it is not possible to turn the fan in order to process the next fan blade at the same working height. As a result, the shaft has to be loosened from time to time and then immobilized once again, which is time-consuming and thus economically disadvantageous.

The repair method according to the invention does not necessarily require the fan to be immobilized, since an energy beam is used that acts on the fan without touching it and without contact pressure on the fan blade. Since no contact forces are needed during the processing, no torque arises from the processing. Even though it can be practical to immobilize the fan during the method according to the invention, for example, in order to offer a counter-bearing for a positioning device that is being used, such an immobilization can be much more gentle, that is to say, with much less mechanical stiffness than was the case with the device required until now, since the forces needed to affix the fan are much lower in the case of the repair method according to the invention. Avoiding mechanical processing of the fan blade also has the advantage that no vibrations are introduced into the fan blades by rotating tools, especially by milling cutters or grinding machines. Such vibrations can cause rattling in the blade roots and thus damage to the coating systems. In the method according to the invention, preferably, only a negligible or no mechanical force is exerted on the gas turbine blade by the processing, so that any vibration excitation or induced torques are very slight, which is advantageous, especially in view of the large lever arms (600 mm to 800 mm) of the fan blades.

Preferably, the energy beam can be aimed at an angle of 5° to 135° relative to the inlet side and/or to the outlet side of the compressor blade or the turbine blade. An advantage of such an arrangement of the energy beam on the side in the area of the material surface that is to be redistributed is that, due to the application of energy at this place, the material is driven to the colder leading edge, so that lost chord length can be built up again relatively easily. In addition, radiation reflected off the melt bath is prevented from heating up component areas other than the leading edge itself. In this manner, a beam catcher can be configured or used or installed more easily.

Preferably, the energy beam is configured as a laser beam. The configuration of the energy beam as a laser beam is advantageous for the repair method since the laser can be used at ambient pressure, meaning that the gas turbine blades that are to be repaired do not have to be placed into a vacuum chamber with great effort, but rather, in an advantageous manner, can also be repaired in the installed state. Furthermore, the use of a laser beam allows a precise and targeted melting of the gas turbine blades so that the repair method is very efficient altogether. Here, the laser is preferably configured as a disk laser, a diode laser, an Nd:YAG laser, a $CO_2$ laser, a gas laser and/or a fiber laser, and it has a power of 200 W to 2000 W. Good results are attained with axis-symmetrical radiation in which the surfaces of the melt bath surface exposed to the beam approximately resemble ellipses. However, other power density distributions such as circles, rings or lines can be advantageous in special cases.

Figure 2:
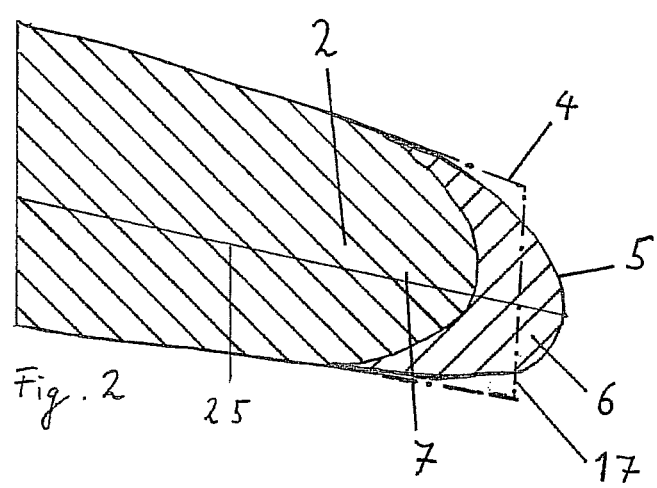
FIG. 2 shows a depiction of the material volume distribution during the recontouring procedure.

FIG. 1 schematically shows two compressor blades 1 from the first compressor stage of an aircraft engine, so-called fan blades. The two compressor blades 1 are arranged one above the other, and the air flow 3 enters from the right-hand side during operation. The compressor blades 1 each have an upper inlet side 18, and a lower outlet side 19 as well as a leading edge 2 facing the air flow 3. The distance from the leading edge 2 of the compressor blade 1 to the trailing edge of the compressor blade 1 is the chord length 25 of the compressor blade. The upper compressor blade 1 has been damaged and shortened in the area of the leading edge 2 by erosion, whereas the lower compressor blade 1 has been repaired by the repair method according to the invention and no longer exhibits this damage. FIG. 2 shows the leading edge 2 in an enlarged view. Its state before the repair according to the invention can be seen in the form of an erosion contour 4. As a rule, the erosion contour 4 is approximately planar and has a face 17. Here, the erosion contour 4 is depicted in a simplified form as a planar surface, but as a rule, erosion contours have a very great roughness and the face 17 is consequently uneven and rough. The state of the leading edge 2 after the repair is shown as the new contour 5. Within the scope of the method, a certain volume of the eroded leading edge 2 is systematically melted and hardens to form an aerodynamically more advantageous shape. This transition from the erosion contour 4 to the new contour 5 is achieved by a redistribution of the material already present. No material is removed or added. The re-hardened material 6 is the front area of the leading edge 2 that has been formed from a melt 16 and behind which the area with the unmelted material 7 is situated. FIG. 2 shows especially clearly how the redistribution of the material of the leading edge 2 leads to an improved aerodynamic geometry. It also becomes clear that it is even possible to achieve a lengthening of the chord length 25 of the compressor blade 1. Thanks to the greater chord length, the repaired compressor blade 1 is aerodynamically better than a compressor blade that has been repaired according to a prior-art method, and besides, it has a longer service life, since the critical chord length at which a repair is no longer possible is only reached after a considerably greater number of recontouring procedures. The method sequences are shown in greater detail in FIGS. 3 and 4.

Figure 3:
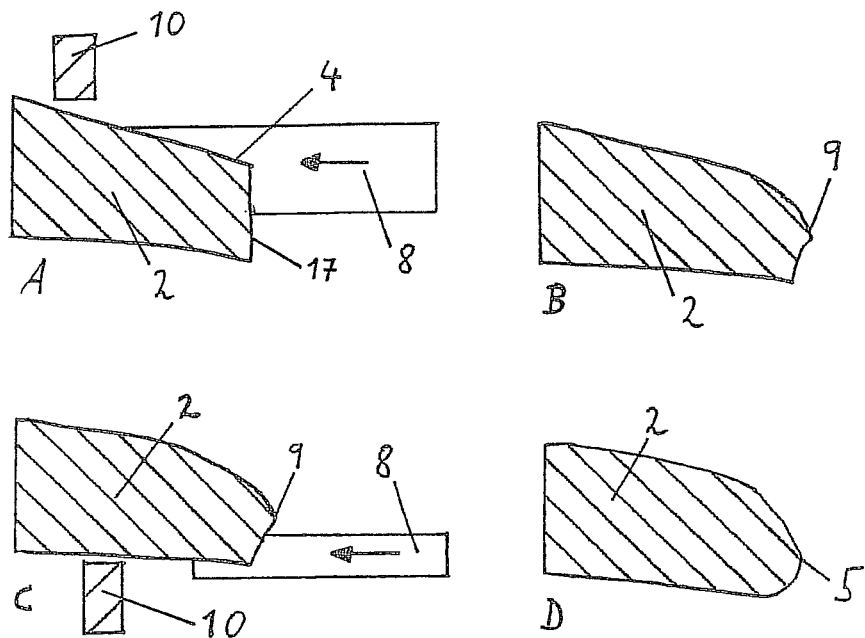
FIG. 3 shows a schematic depiction of a recontouring procedure, with an energy beam aimed directly at the leading edge.

FIG. 3 shows the method sequences of a first repair. In this embodiment, the repair comprises the four depicted partial steps A, B, C and D. Step A shows a leading edge 2 with an erosion contour 4 that is to be repaired. An energy beam 8 is aimed at the upper half of the leading edge 2, a process in which the energy beam 8 is aimed perpendicular to the face 17 of the leading edge 2. The energy beam 8 melts a portion of the leading edge 2 to form a rounding radii as shown in FIG. 3. A beam catcher 10 is arranged in the rear area of the leading edge 2 in order to absorb any radiation of the energy beam 8 that might be reflected. The subsequently depicted partial step B shows the leading edge 2 after the material has hardened again. In this intermediate step, the leading edge 2 has a transition contour 9. In partial step C, the energy beam 8 is aimed at the lower part of the leading edge 2, and, as in partial step A, a beam catcher 10 is provided in order to absorb reflected radiation. As in step A, the energy beam 8 systematically melts material of the leading edge 2, utilizing the surface tension of the material melt in order to create a rounding radii of the leading edge 2. The leading edge 2 that has been repaired in this manner is shown in partial step D; it has a desired aerodynamically advantageous new contour 5.

Figure 4:
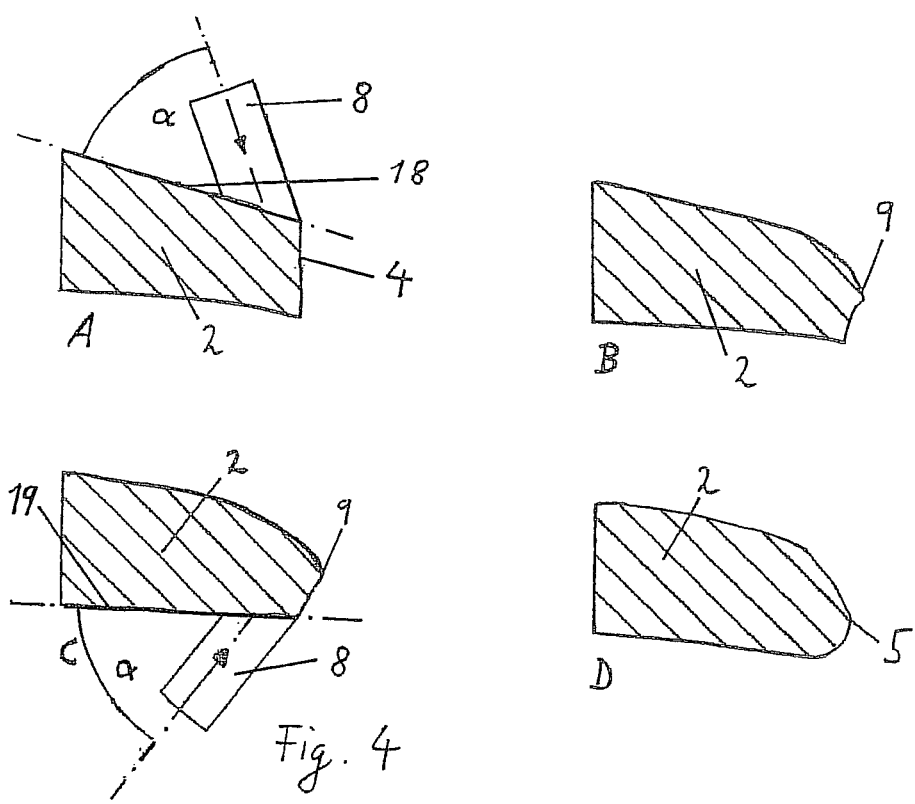
FIG. 4 shows a schematic depiction of a recontouring procedure, with an energy beam aimed at an angle to the leading edge.

FIG. 4 shows the method sequences of a second repair. Similar to the method steps in FIG. 3, a leading edge 2 of a compressor blade 1 is shown in partial step A. The top of the leading edge 2 is part of the inlet side 18 of the compressor blade 1. The front area of the leading edge 2 has an erosion contour 4. An energy beam 8 is aimed at the leading edge 2 at an angle α relative to the inlet side 18. Preferably, the angle α is 5° to 135°. A portion of the leading edge is melted by the energy beam 8 and is rounded off to form the rounding radii shown, utilizing the surface tension of the material melt. Partial step B shows the leading edge 2 that has a transition contour 9 and that was created by partial step A. Partial step C shows how an energy beam 8 is aimed at the leading edge 2 of partial step B. The energy beam 8 is arranged at an angle α relative to the bottom of the leading edge 2, and the bottom is part of the outlet side 19 of the compressor blade 1. Preferably, the angle α is 5° to 135°. The result of partial step C is shown in partial step D, which shows the leading edge 2 that has been provided with a rounding radii and repaired in this manner with the aerodynamically optimized new contour 5. By aiming the energy beam 8 at an angle α relative to the inlet side or outlet side of the compressor blade 1, the generated material melt is preferably driven to the front of the leading edge 2. This systematic handling of the melt bath is illustrated in FIG. 5.

Figure 5:
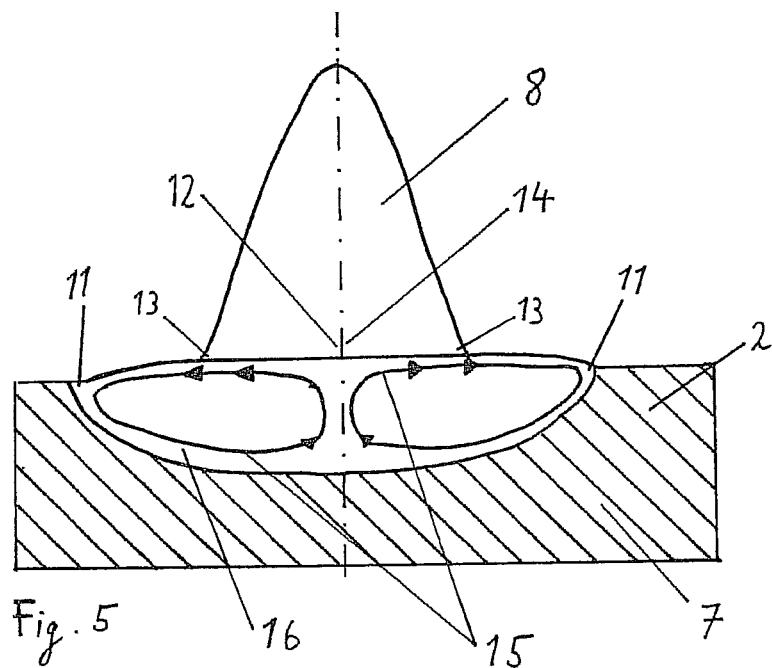
FIG. 5 shows a depiction of the material flows in melted material areas.

FIG. 5 shows the material flows of the generated melt 16. An energy beam 8 is aimed at an area of the leading edge 2 of a compressor blade 1. The energy beam 8 here has a Gaussian intensity profile. Thanks to this energy profile, the power maximum 14 lies in the center of the Gaussian shape, and power minima 11 are present at the edge of the intensity profile. The material melted by the energy beam 8, the melt 16, is shown under the energy beam 8. Unmelted material 7 is located under the melt 16. The temperature maximum 12 of the melt 16 is in the area of the power maximum 14 of the energy beam. The temperature minima 11 of the melt 16 are in the area of the transition between the melt 16 and unmelted material 7. The flow direction 15 of the melt 16 is axis-symmetrical to the center axis of the energy beam 8. On the melt bath surface, the fast melt bath flows follow the temperature gradient from the temperature maximum 12 in the middle of the melt bath to the temperature minima 11 in the edge areas of the melt bath, thereby transporting the coupled-in energy primarily to the edge areas, where the energy is available to exceed the melt temperature or to break up the bonding energy of the crystal bond. On the way back along the bottom of the melt bath, this energy is hardly or not at all available any longer.

The flow processes in metal melts are influenced by the surface tension gradient. The relationship between the surface tension γ, the temperature T and the tension gradient (dγ/dT) is the following:

$$\gamma = \gamma_0 + d\gamma/dT \cdot T$$

At the melt temperature of a material, the temperature-dependent surface tension γ has a surface tension value $\gamma_0$. As the temperature T rises, this surface tension γ changes by the tension gradient (dγ/dT). The higher the gradient, the greater the flows to compensate for the tension gradient. In the case of pure metals, the tension gradient is negative. This means that, as the temperature T rises, these metal melts display a drop in surface tension. This effect is utilized in order to achieve the desired rounding radius by regulating the temperature of the surface. The traversing speed, the magnitude of the energy applied, and the power density distribution of the energy on the surface are all utilized for purposes of regulating the temperature.

Figure 6:
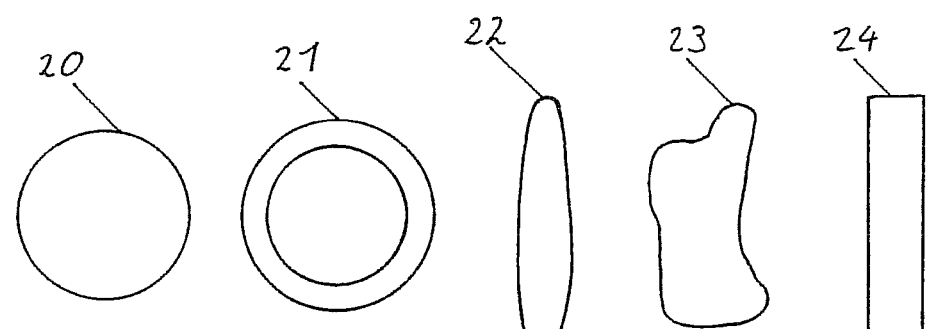
FIG. 6 shows profiles of differing power density distributions.

The energy applied via the energy beam 8 is distributed in the melt bath in the form of kinetic and thermal energy. For example, in a titanium melt, the flow is primarily in the direction in which the melt bath is expanding. These thermal-physical interactions are utilized in order to melt the leading edge 2 in an ideal manner so as to achieve a tangential feed of the melt surfaces with respect to the upper inlet side 18 and the outlet side 19. The material is driven to the leading edge 2 and it then hardens to form an aerodynamically advantageous shape. The rounding radii are configured over the length of the compressor blade 1 in accordance with the flow requirements, especially during the recontouring of fan blades. For this purpose, the rounding radii are configured higher in the vicinity of the axis and smaller at the end (tip). The power density distribution of the energy beam 8 plays a significant role in this context. Various such power density distributions are shown in FIG. 6.

Good results are attained with axis-symmetrical radiation in which the power density distribution, that is to say, the geometry of the surfaces on the melt bath surface exposed to the beam, approximately resembles an ellipse 22. However, other power density distributions such as circles 20, rings 21, lines 24 or specially adapted power density distributions 23 can also be advantageous in special cases. Due to these beam profiles, the melt flow and thus also the melting of material is systematically achieved, so that especially the edge area and the entire volume below the partially melted surface are melted. Here, the laser is preferably configured as a disk laser, a diode laser, an Nd:YAG laser, a $CO_2$ laser (gas laser) and/or as a fiber laser, and it has a power of 200 W to 2000 W. An important aspect is the advance rate at which the laser power is coupled into the turbine blade. The following parameter settings have proven to be advantageous: 300 W at 500 mm/min, 600 W at 1 m/min or 1.1 kW at 2 m/min. This procedure can also be assisted by reactive process gases such as, for instance, nitrogen. The melting process, however, is preferably carried out under an inert process gas atmosphere.

Thanks to the described method, it is not only possible to avoid the formation of chips or dust, but there is also no need to immobilize or rebalance the engine. Moreover, the chord length is not shortened, but rather, even an eroded chord length can be partially built up again. Furthermore, the method can be carried out on wing, for example, in order to recontour fan blades without the loss of material, hence offering an exceptionally advanced and economical repair method for compressor blades and turbine blades. The advance rate of the energy beam 8 as well as the regulation of the energy density or the energy distribution of the energy beam 8 make it possible to regulate the temperature in the melt bath in such a way as to achieve the desired new contour 5 once the melt bath has hardened.

While the invention has been particularly shown and described with reference to preferred embodiments thereof, it will be understood by those skilled in the art that various changes in form and details may be made therein without departing from the spirit and scope of the invention.

LIST OF REFERENCE NUMERALS 1 compressor blade
2 leading edge
3 air flow
4 erosion contour
5 new contour
6 re-hardened material
7 unmelted material
8 energy beam
9 transition contour
10 beam catcher
11 temperature minimum
12 temperature maximum
13 power minimum
14 power maximum
15 direction of flow
16 melt
17 face
18 inlet side
19 outlet side
20 circle
21 ring
22 ellipse
23 specially adapted power density distributions
24 line
25 chord length

What is claimed is:

1. A method for recontouring an eroded blade of a gas turbine comprising:
   systematically melting a portion of a leading edge of the blade using an energy beam so as to round off an erosion contour at the leading edge of the blade and form a new contour of hardened material, wherein the melting produces a melt volume from the erosion contour in a melt zone and wherein no additional material is incorporated into the melt zone or only additional material which constitutes less than 50% of the melt volume is incorporated into the melt zone.

2. The method recited in claim 1, wherein the blade is one of a turbine blade and a compressor blade.

3. The method recited in claim 1, wherein the new contour is a specified contour.

4. The method recited in claim 1, wherein the melting includes rounding off the leading edge of the blade.

5. The method recited in claim 1, further comprising regulating energy from the energy beam that is introduced to the portion of the leading edge of the blade so as to create different rounding radii.

6. The method recited in claim 1, wherein the systematic melting includes melting the leading edge multiple times so as to form the new contour.

7. The method recited in claim 6, wherein the leading edge is melted no more than six times.

8. The method recited in claim 6, wherein the melting includes aiming the energy beam into the leading edge in a direction that is perpendicular to a face of an erosion contour.

9. The method recited in claim 1, wherein the melting produces rounding radii in a range from 0.1 mm to 10 mm.

10. The method recited in claim 1, wherein the additional material is incorporated by introducing small amounts of additional substances into the melt zone.

11. The method recited in claim 1, wherein the recontouring is performed on wing.

12. The method recited in claim 1, wherein the melting includes aiming the energy beam at an angle in a range of 5° to 135° relative to at least one of an inlet side and an outlet side of the blade.

13. The method recited in claim 1, further comprising lengthening a chord length of the blade by 0.1 mm to 5 mm.

14. The method recited in claim 1, wherein the energy beam is a laser beam.

15. The method recited in claim 14, wherein the laser beam is configured as at least one of disk laser, a diode laser, an ND:YAG laser, a $CO_2$ laser and a fiber laser.

16. The method recited in claim 14, wherein a laser power of the laser beam is in a range of 200 W to 2000 W.

* * * * *